Jan. 31, 1933.  S. VERNET ET AL  1,895,502
WEIGHING SCALE
Filed July 24, 1931   2 Sheets-Sheet 1

INVENTORS
Sergius Vernet
Artemas J. Haynes
BY
ATTORNEY

Jan. 31, 1933.  S. VERNET ET AL  1,895,502

WEIGHING SCALE

Filed July 24, 1931   2 Sheets-Sheet 2

Sergius Vernet INVENTORS
Artemas J. Haynes
BY
ATTORNEY

Patented Jan. 31, 1933

1,895,502

UNITED STATES PATENT OFFICE

SERGIUS VERNET, OF BROOKLYN, AND ARTEMAS J. HAYNES, OF FOREST HILLS, NEW YORK

WEIGHING SCALE

Application filed July 24, 1931. Serial No. 552,878.

This invention relates to weighing apparatus and the objects of the invention are to provide a simple, practical, durable and inexpensive device of this type, in compact form and adapted to be easily read.

These various objects are attained by the novel features of construction, combinations and relations of parts hereinafter described, illustrated and broadly claimed.

The drawings accompanying and forming part of the specification illustrate one commercial embodiment of the invention, it being understood that the structure may be modified as regards this particular disclosure, without departure from the true spirit and broad scope of the invention.

Figure 1:
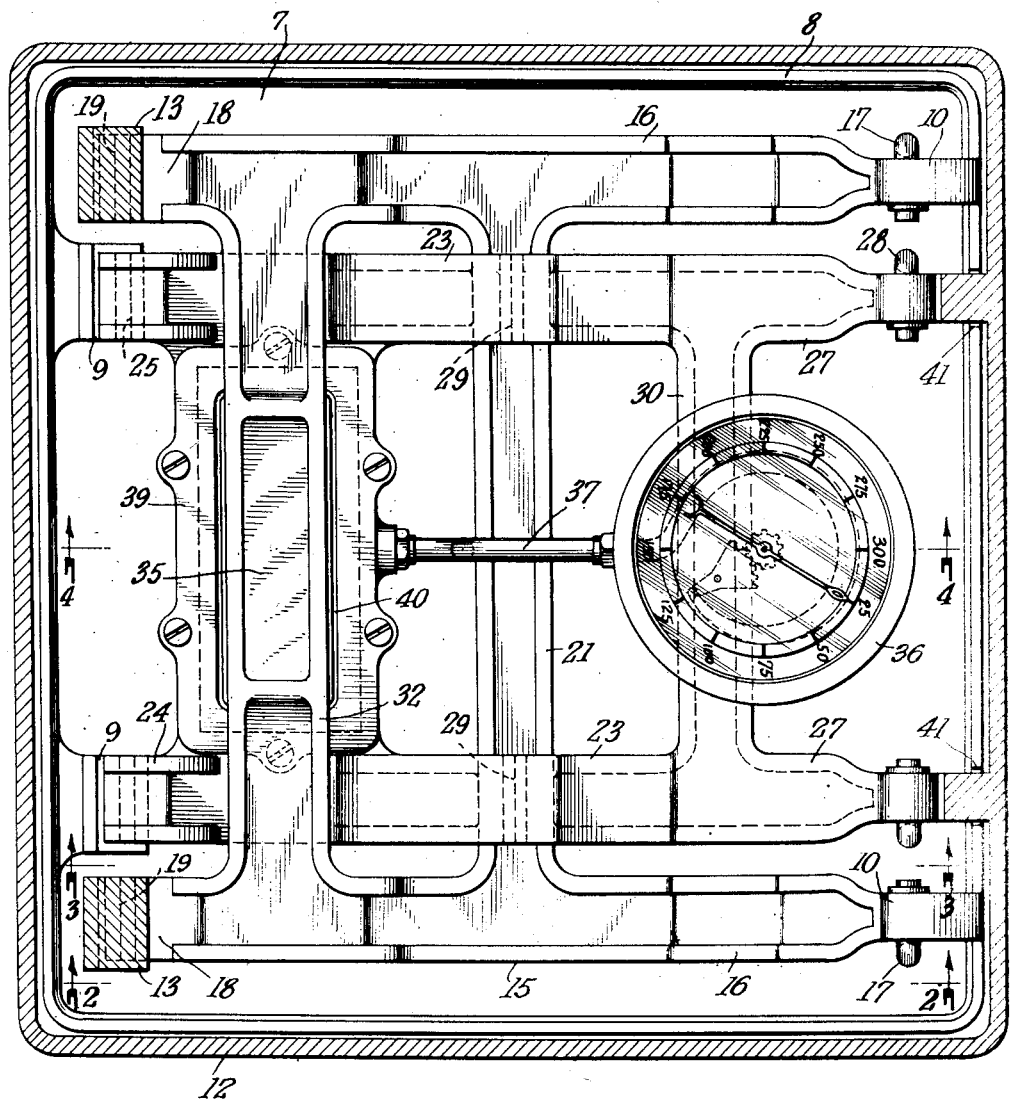
Figure 2:
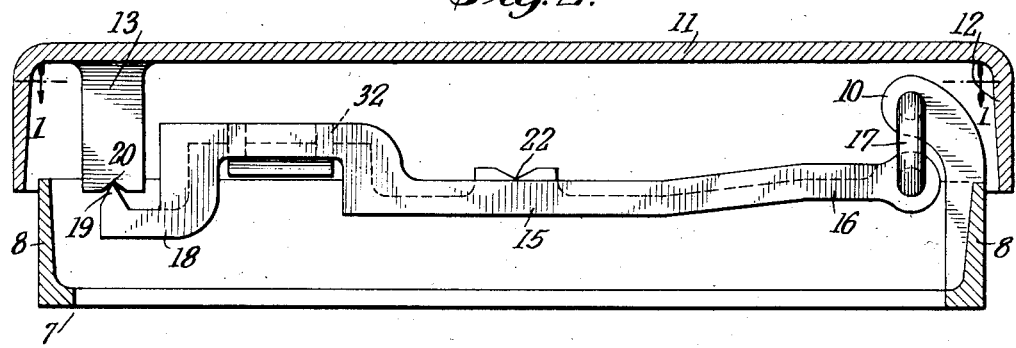
Figure 3:
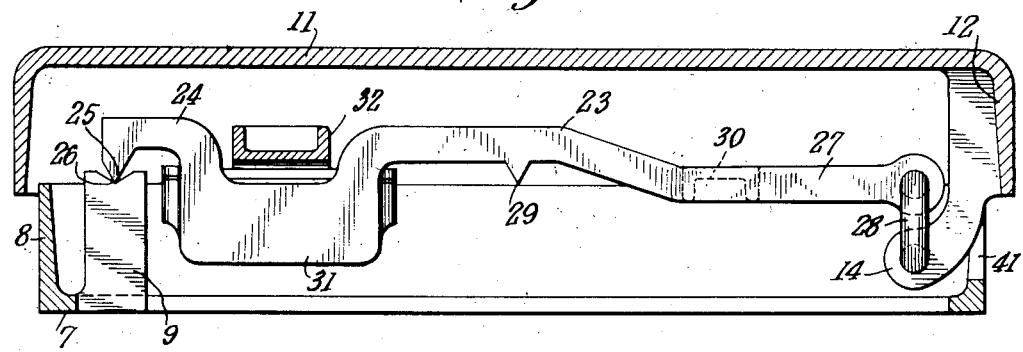
Figure 4:
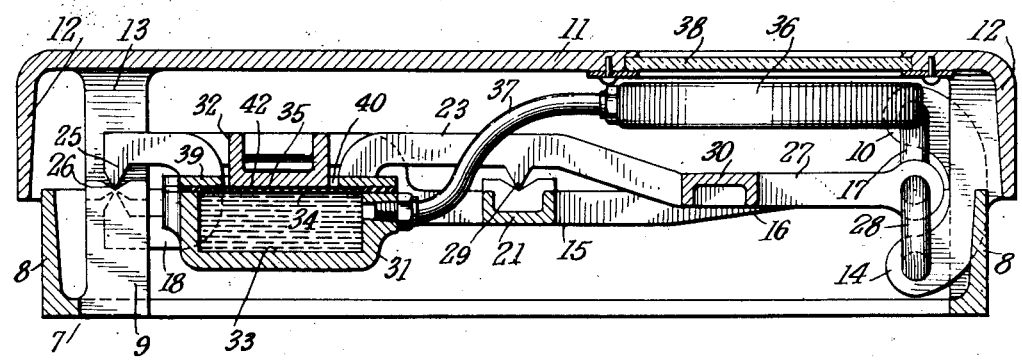

Fig. 1 is a horizontal sectional view of the scale as taken on substantially the plane of line 1—1 of Fig. 2, with the active parts of the scale appearing in plan and the rim and other integral portions of the scale platform appearing in section; Figs. 2, 3 and 4 are cross-sectional views, substantially on lines 2—2, 3—3 and 4—4 of Fig. 1, showing details of the leverage system and the pressure actuated indicator mechanism carried thereby.

The base of the scale is illustrated as a generally rectangular skeleton frame 7, having an upstanding flange 8 and provided adjacent one edge, the left hand edge in the several views, with the internal supports or fulcrum posts 9 and adjacent the opposite edge with the upstanding inwardly arched supports 10.

The scale platform 11 is shown as similarly shaped and as having a dependent flange 12, coming down over the upstanding flange of the base. This top member has adjacent one edge, the dependent fulcrum posts 13, in line with fulcrum posts 9 of the base and adjacent the opposite edge, the dependent inwardly arched posts 14, in line with posts 10 of the base.

The suspension system consists in the illustration of crossed levers pivotally connected in "scissors" relation and connected at opposite ends with the base and platform respectively. These scale levers are branched at their opposite ends for connection at the four fulcrum points. Thus one lever 15 has branches 16, suspended by links 17, from the base supports 10 and oppositely extending branches 18, terminating in knife edges 19, engaging the bearings 20, in the fulcrum posts of the platform. The branched portions of this lever are connected by a cross bar 21, carrying open bearings 22 for the center pivot of the two levers.

The second scale lever is designated 23 and this like the other, is branched for connection with the four fulcrums. Thus two of the branches 24 have knife edges 25, seating in bearings 26 on the posts 9 of the base and the opposite end branches 27 of this lever are connected by links 28, with the inwardly arched dependent posts 14 of the scale top. At the center line, the sides of the second lever carry knife edges 29, seating in the bearings 22, carried by the cross bar of the first lever.

The branches or sides of the second lever are connected near one end by cross bar 30 and adjacent the opposite end by a cross piece 31, opposed to a cross piece 32 connecting the branches or sides of the first lever. The two levers thus are in the nature of open parallel sided frames and as may be noted in Fig. 1, the side portions of the second frame 23 are spaced a less distance apart than the sides of the first lever, so that said second lever may pass from a position above the second lever down between the cross bars 21, 32, into position beneath the first lever. This crossed arrangement of the levers provides the desired so-called "scissors" relation, with the levers pivoted together at the center and each connected at opposite ends with the base and top respectively. With such construction, also it will be noted, all suspension points may be located in the same horizontal plane, with the links at the right hand ends of the levers, allowing for the necessary slight arcuate motion of the lever ends.

The weight indication is provided in the present invention by a pressure developing device interposed between the crossed levers and connected with a suitable pressure sensitive indicating device. In the illustration, the pressure developing mechanism consists simply of a liquid holding chamber 33, formed as a cavity in cross bar 31 of the second lever, closed at the top by a flexible diaphragm 34, acted upon by a piston head 35 on the overstanding cross bar 32. The pressure responsive device is shown as a suitably calibrated pressure gage 36, connected with the pressure chamber by a short loop of piping 37.

The pressure gage may be of the Bourdon tube type as indicated in Fig. 1 and it may be supported beneath the platform in position to be read through a window 38 therein.

The pressure device, forming as it does part of and being carried by opposing portions of the scale levers, requires no additional mounting and the gage may be supported by the piping 37, so as to require no special mounting. The relative movements of the scale levers and of the platform in respect thereto, are relatively slight, so that only small clearance need be provided between such parts and the gage, such as indicated in Fig. 4, the gage "floating" with the levers, supported from the pressure chamber of the lower lever free of contact with both the upper lever and the platform.

The location of the pressure developing mechanism between the levers and at one side of their pivotal connection, provides a very compact construction and avoids the necessity of providing any special mounting means for such mechanism on the base or platform of the scale. Greater accuracy is obtained because of the directness of applied force without interposing frictional or other variations. The parts are readily assembled, it being observed that the upper piston member of the pressure device merely rests on the diaphragm closing the top of the pressure chamber. Preferably, as indicated, the piston member covers the maximum portion of the area of the diaphragm, which latter may be protected against rupture by a flange 39, overstanding the diaphragm, except for the small clearance 40, about the sides of the piston element.

The various parts of the scale are relatively sturdy and may be produced inexpensively. Also the assembly of the structure is readily accomplished, without requiring special skill or care. The base and platform cooperate to form an enclosure about the moving parts of the apparatus. The vertical enclosing flange of the base is shown as slotted at 41, for the dependent fulcrum lugs on the top, but these slots need not be so extensive as to impair the enclosing characteristics of the structure. The diaphragm 34 may be of rubber or other sufficiently resilient or flexible material and to save and protect the same from wear, etc. as much as possible, it may be covered with a thin layer 42 of flexible material such as leather or the like confined by the securing flange 39 and bridging the gap 40 between the plunger and flange.

The embodiment illustrated may be considered as typifying a preferred form of the invention, but it will be apparent that details and structure may be changed to meet different conditions or requirements, all within the broad scope of the claims. The language employed also is to be considered in a descriptive, rather than in a limiting sense, except possibly for such limitations as may be imposed by the state of the prior art.

What is claimed is:

1. A weighing scale comprising in combination with crossed scale levers and a scale platform acting thereon, a fluid pressure device having companion elements interposed between and carried by said crossed scale levers and a suitably calibrated pressure gage operatively connected with said pressure device.

2. A weighing scale comprising in combination with crossed scale levers and a scale platform acting thereon, a fluid pressure device having companion elements interposed between and carried by said crossed scale levers, a suitably calibrated pressure gage operatively connected with said pressure device, said pressure device comprising a pressure chamber carried by one scale lever and provided with a flexible wall and a piston element connected with the other scale lever and bearing on said flexible wall.

3. A weighing scale comprising a base and a platform, scale levers interposed between said base and platform, companion members of a fluid pressure device carried by said scale levers and pressure actuated indicating means operatively connected with said fluid pressure device.

4. In combination, a scale platform having a window therein, platform suspending means beneath the latter, a fluid pressure device actuated by said suspending means beneath the platform and a suitably calibrated pressure gage connected with said pressure device and supported beneath the platform in position for viewing through said platform window.

5. In combination, a scale platform having a window therein, platform suspending means beneath the latter, a fluid pressure device actuated by said suspending means beneath the platform and a suitably calibrated pressure gage connected with said pressure device, said gage being supported independently of the platform by a rigid conduit connection from the pressure device.

6. A weighing scale comprising a base and an overstanding platform, crossed scale levers having an intermediate pivotal connection and pivotally connected at their opposite ends with the base and platform respectively, a flexible walled pressure chamber carried by one of the levers, a pressure applying member carried by the other lever and acting on the flexible walled pressure chamber and a pressure responsive weight indicator connected with the pressure chamber.

7. A weighing scale comprising a base and an overstanding platform, crossed scale levers having an intermediate pivotal connection and pivotally connected at their opposite ends with the base and platform respectively, a flexible walled pressure chamber carried by one of the levers, a pressure applying member carried by the other lever and acting on the flexible walled pressure chamber, a pressure responsive weight indicator connected with the pressure chamber, said indicator being supported beneath the platform and said platform having a window exposing said indicator.

8. A weighing scale comprising a base and an overstanding platform, crossed scale levers having an intermediate pivotal connection and pivotally connected at their opposite ends with the base and platform respectively, a flexible walled pressure chamber carried by one of the levers, a pressure applying member carried by the other lever and acting on the flexible walled pressure chamber, a pressure responsive weight indicator connected with the pressure chamber, the scale levers being arranged in crossed relation with a rocking pivotal connection at the center and rocking pivotal connections at one side of the center with the base and platform respectively, said levers at the opposite side of the center having swinging link connections with the base and platform.

9. A weighing scale comprising a base and an overstanding platform, crossed scale levers having an intermediate pivotal connection and pivotally connected at their opposite ends with the base and platform respectively, a flexible walled pressure chamber carried by one of the levers, a pressure applyng member carried by the other lever and acting on the flexible walled pressure chamber, a pressure responsive weight indicator connected with the pressure chamber, the scale levers being arranged in crossed relation with a rocking pivotal connection at the center, rocking pivotal connections at one side of the center with the base and platform respectively, said levers at the opposite side of the center having swinging link connections with the base and platform and the members of the pressure device being positioned between crossing portions of the levers between the rocking center pivot and the rocking side pivots.

10. A weighing scale comprising a base and a platform, a lever having knife edge bearings on said base at one end and swinging link connections with the platform at the opposite end, a second lever having knife edge connections with the platform at the same side of the scale with the knife edge bearings of the first lever and having swinging link connections with the base at the same side of the scale with the swinging link connections of the first lever, said two levers having an intermediate knife edge bearing and a pressure device interposed between and supported by the two levers.

11. A weighing scale comprising a base and a platform, a lever having rocking bearings on said base at one end and swinging link connections with the platform at the opposite end, a second lever having rocking bearings with the platform at the same side of the scale with the rocking bearings of the first lever and having swinging link connections with the base at the same side of the scale with the swinging link connections of the first lever, said two levers having an intermediate rocking bearing and a pressure device interposed between and supported by the two levers.

12. A weighing scale comprising a base and a platform, a lever having rocking bearings on said base at one end and swinging link connections with the platform at the opposite end, a second lever having rocking bearings with the platform at the same side of the scale with the rocking bearings of the first lever and having swinging link connections with the base at the same side of the scale with the swinging link connections of the first lever, said two levers having an intermediate rocking bearing, a pressure device interposed between and supported by the two levers and a pressure responsive indicator supported at a distance from the pressure device and connected therewith by a fluid conduit.

13. A weighing scale comprising base and platform members, skeleton levers having spaced side portions connected by cross bars and said side portions being connected at opposite ends with the base and platform respectively, the side portions of one of said skeleton levers crossing and having a pivotal engagement with a cross bar portion of the other lever and companion members of a pressure device supported in opposition by other cross bar members of the skeleton levers.

14. A weighing scale comprising base and platform members, skeleton levers having spaced side portions connected by cross bars and said side portions being connected at opposite ends with the base and platform respectively, the side portions of one of said skeleton levers crossing and having a pivotal engagement with a cross bar portion of the other lever, companion members of a pressure device supported in opposition by other cross bar members of the skeleton levers, a pressure conduit extending from one member of said pressure device and a pressure responsive indicator connected with said conduit.

15. A weighing scale comprising a base having an upstanding flange and provided within said flange with upstanding fulcrum posts at one side and upstanding inwardly arched posts at the opposite side, a platform overstanding the base and having dependent fulcrum posts at one side and dependent inwardly arched posts at the opposite side, levers having crossed intermediate portions in bearing engagement, one of said levers being fulcrumed on upstanding posts of the base at one end and swivelly connected with dependent posts of the platform at the opposite end, the other lever being fulcrumed on dependent posts of the platform at one end and swivelly hung from upstanding posts of the base at the opposite end, a pressure chamber on one of the levers, said pressure chamber having a flexible wall, a piston element carried by the other lever and bearing on said flexible wall and a pressure responsive indicator operatively connected with said pressure chamber.

16. In a weighing scale, the combination of crossed scale levers, a pressure chamber carried by one of said levers, a flexible diaphragm closing said pressure chamber, a confining flange overstanding said flexible diaphragm but leaving a portion of the same exposed, a piston member approximating the shape of the opening in said flange but operating freely therethrough, said piston member being actuated by the other lever and a pressure responsive weight indicator operatively connected with the pressure chamber.

17. In a weighing scale, the combination of crossed scale levers, a pressure chamber carried by one of said levers, a flexible diaphragm closing said pressure chamber, a confining flange overstanding said flexible diaphragm but leaving a portion of the same exposed, a piston member approximating the shape of the opening in said flange but operating freely therethrough, said piston member being actuated by the other lever, a pressure responsive weight indicator operatively connected with the pressure chamber and a flexible reinforcement over the diaphragm and bridging the space between the piston member and the confining flange.

18. In a weighing scale, the combination of a scale platform, scale levers supporting the same, a rigid fluid cavity formed in one lever, a flexible diaphragm closing said cavity, a retaining flange over said diaphragm and extending inwardly beyond the inner walls of the cavity and a plunger actuated by the other scale lever and bearing on said diaphragm adjacent the inner edge of the retaining flange.

19. A weighing scale comprising a base and a platform, scale levers interposed between said base and platform, a fluid pressure device floatingly carried by said scale levers independently of the base and indicating means operatively connected with said floating fluid pressure device.

In testimony whereof we affix our signatures.

SERGIUS VERNET.
ARTEMAS J. HAYNES.